(12) United States Patent
Huang et al.

(10) Patent No.: US 10,488,999 B2
(45) Date of Patent: Nov. 26, 2019

(54) TOUCH PANEL AND TOUCH CONTROL DEVICE

(71) Applicant: Wuhan China Star Optoelectronics Technology Co., Ltd., Wuhan, Hubei (CN)

(72) Inventors: Yao-li Huang, Guangdong (CN); Hongsen Zhang, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/744,306

(22) PCT Filed: Nov. 25, 2017

(86) PCT No.: PCT/CN2017/112982
§ 371 (c)(1),
(2) Date: May 2, 2018

(87) PCT Pub. No.: WO2019/080244
PCT Pub. Date: May 2, 2019

(65) Prior Publication Data
US 2019/0129531 A1    May 2, 2019

(30) Foreign Application Priority Data
Oct. 26, 2017   (CN) .......................... 2017 1 1037582

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04112* (2013.01)

(58) Field of Classification Search
None
See application file for complete search history.

(56) References Cited

U.S. PATENT DOCUMENTS

| 2010/0194699 A1* | 8/2010 | Chang ..................... G06F 3/044 345/173 |
| 2014/0009428 A1 | 1/2014 | Coulson |

(Continued)

FOREIGN PATENT DOCUMENTS

| CN | 105814525 A | 7/2016 |
| CN | 105843429   | 8/2016 |

(Continued)

OTHER PUBLICATIONS

CN SIPO First Office Action for Appl. No. 201711037582.0 (dated May 27, 2019).

*Primary Examiner* — Christopher J Kohlman
(74) *Attorney, Agent, or Firm* — Hemisphere Law, PLLC; Zhigang Ma (57) ABSTRACT

A touch panel and a touch control device are provided. The touch panel includes a plurality of driving electrode chains extending along a first direction and a plurality of sensing electrode chains extending along the second direction. The sensing electrode chains includes a first sub-chain and a second sub-chain, which are parallel to and insulated from each other. A first capacitor for deciding a position of a touching element projected on the touch panel is formed by a portion of the driving electrode chain between the neighboring sensing electrode chains and one of the first sub-chain and the second sub-chain which is closer to the portion of the driving electrode chain, and a second capacitor for deciding a height of the touching element floating on the touch panel is formed by the portion of the driving electrode chain between the neighboring sensing electrode chains and the other sub-chain.

18 Claims, 8 Drawing Sheets

(56) References Cited

U.S. PATENT DOCUMENTS

| | | | | |
|---|---|---|---|---|
| 2014/0306916 A1* | 10/2014 | Wang | ................ | G06F 3/041 |
| | | | | 345/173 |
| 2015/0084911 A1* | 3/2015 | Stronks | ............ | G06F 3/0416 |
| | | | | 345/174 |
| 2016/0062542 A1* | 3/2016 | Kim | ................ | G06F 3/0414 |
| 2019/0034013 A1* | 1/2019 | Hu | ................ | G06F 3/0412 |

FOREIGN PATENT DOCUMENTS

| | | |
|---|---|---|
| CN | 105988653 A | 10/2016 |
| CN | 106569635 A | 4/2017 |

\* cited by examiner

TOUCH PANEL AND TOUCH CONTROL DEVICE

RELATED APPLICATIONS

The present application is a National Phase of International Application Number PCT/CN2017/112982, filed Nov. 25, 2017, and claims the priority of China Application No. CN 201711037582.0, filed Oct. 26, 2017.

FIELD OF THE DISCLOSURE

The present invention is related to touch control technology, and more particularly is related to a touch panel and a touch control device.

BACKGROUND

Attending with the development of touch control technology, the touch control devices have been progressed from the physical keypads of traditional cell phones to the virtual keypads integrated with the touch panel of the smart phones, which make communication of the human-computer interface more convenient and user's friendly. There are many types of touch control technologies. For the touch control technology used in small to medium size touch control devices (such as cell phones, tablets, notebooks, and etc.), the main trend has been shifted from the conventional externally combined touch panel (TP) to the in-cell touch panel (ITP). In addition, in order to implement additional touch control functions, the touch control functions, such as Force Touch, fingerprint identification, and etc., have been integrated into the in-cell touch panels. In present, 2D display technology still dominates the display market and so does the 2D touch control technology. However, attending with the development and mature of 3D display technology, 3D holographic technology will become the main trend in the future and the applications of floating touch will be expanded. Accordingly, the research of floating positioning technology is particularly important.

SUMMARY

A touch panel is provided in the present invention. The touch panel comprises a plurality of driving electrode chains extending along a first direction and spaced apart along a second direction, and a plurality of sensing electrode chains extending along the second direction and spaced apart along the first direction. The driving electrode chains and the sensing electrode chains are insulated from each other. The sensing electrode chains includes a first sub-chain and a second sub-chain, and the first sub-chain and the second sub-chain are parallel to and insulated from each other. A first capacitor is formed by a portion of the driving electrode chain between the two neighboring sensing electrode chains and one of the first sub-chain and the second sub-chain which is closer to the portion of the driving electrode chain, and the first capacitor is utilized for deciding a position of a touching element projected on a surface of the touch panel. A second capacitor is formed by the portion of the driving electrode chain between the two neighboring sensing electrode chains and the other one of the first sub-chain and the second sub-chain, and the second capacitor is utilized for deciding a height of the touching element floating on the surface of the touch panel.

In compared with the conventional technology, the touch panel provided in the present invention has the sensing electrode chain divided into two sub-chains, i.e. the first sub-chain and the second sub-chain. The first sub-chain is parallel to and insulated from the second sub-chain. A first capacitor is formed by a portion of the driving electrode chain between the two neighboring sensing electrode chains and one of the first sub-chain and the second sub-chain which is closer to the portion of the driving electrode chain. The first capacitor is utilized for deciding a position of a touching element projected on the surface of the touch panel, i.e. the planar coordinate of the touching element on the surface of the touch panel. The second capacitor is formed by the portion of the driving electrode chain between the two neighboring sensing electrode chains and the other one of the first sub-chain and the second sub-chain. The second capacitor is utilized for deciding the height of the touching element away from the surface of the touch pane. Thus, by integrating the results of the first capacitor and the second capacitor, the specific position of the touching element in the space above the touch panel can be determined to implement the function of floating positioning.

A touch control device is also provided in the present invention. The touch control device includes the aforementioned touch panel.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Figure 1:
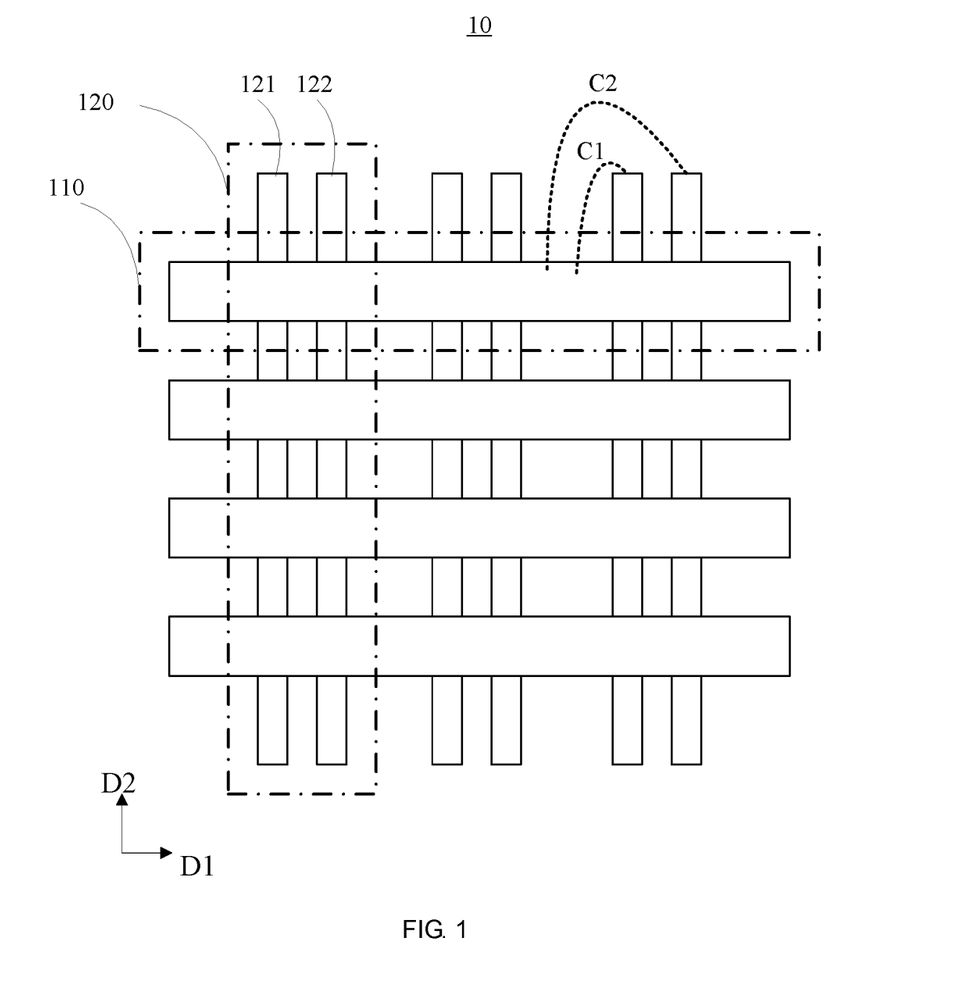
FIG. 1 is a structural schematic view of a touch panel provided in accordance with a first embodiment of the present invention.

Please refer to FIG. 1, which is a structural schematic view of a touch panel provided in accordance with a first embodiment of the present invention. The touch panel 10 includes a plurality of driving electrode chains 110, which extend along a first direction D1 and are spaced apart along a second direction D2, and a plurality of sensing electrode chains 120, which extend along the second direction D2 and are spaced apart along the first direction D1. The driving electrode chains 110 and the sensing electrode chains 120 are insulated from each other. The sensing electrode chains 120 includes a first sub-chain 121 and a second sub-chain 122. The first sub-chain 121 and the second sub-chain 122 are parallel to and insulated from each other. A first capacitor C1 is formed by a portion of the driving electrode chain 110 between the two neighboring sensing electrode chains 120 and one of the first sub-chain 121 and the second sub-chain 122 which is closer to the portion of the driving electrode chain 110. The first capacitor C1 is utilized for deciding a position of a touching element projected on a surface of the touch panel 10. A second capacitor C2 is formed by the portion of the driving electrode chain 110 between the two neighboring sensing electrode chains 120 and the other one of the first sub-chain 121 and the second sub-chain 122. The second capacitor C2 is utilized for deciding a height of the touching element floating on the surface of the touch panel 10.

Within a 3D coordinate system (i.e. X, Y, Z coordinate system), the first capacitor C1 is utilized for deciding the X-axis value and the Y-axis value of the touching element, and the second capacitor C2 is utilized for deciding the Z-axis value of the touching element.

Wherein, the first direction D1 is orthogonal to the second direction D2. The first direction D1 can be the X-axis direction or the Y-axis direction, and the second direction D2 can be the X-axis direction or the Y-axis direction. When the first direction D1 is the X-axis direction, the second direction D2 would be the Y-axis direction. When the first direction D1 is the Y-axis direction, the second direction D2 would be the X-axis direction. In the exemplary embodiment of the present invention, the first direction D1 is the X-axis direction, and the second direction D2 is the Y-axis direction.

Wherein the meaning of "extend" indicates the outward elongation or spreading regarding the width, the size, or the range. In the present embodiment, it refers to the outward elongation of the driving electrode chain 110 along the first direction D1, and the outward elongation of the sensing electrode chain 120 along the second direction D2.

Wherein, the driving electrode chains 110 are arranged to insulatedly cross the sensing electrode chains 120.

It is understood that in the present embodiment, the driving electrode chain 110 and the sensing electrode chain 120 are disposed at different layers.

Wherein, the first sub-chain 121 and the second sub-chain 122 are parallel to and insulated from each other.

Concretely speaking, the first sub-chain 121 and the second sub-chain 122 can be arranged to leave a gap therebetween for separating the two sub-chains, and the insulating material can be used to fill the space between the first sub-chain 121 and the second sub-chain 122. Such arrangements are capable to prevent the unwanted contact between the first sub-chain 121 and the second sub-chain 122 to compose a single sensing electrode chain 120 rather than two independent capacitors for implementing the function of floating positioning.

Furthermore, the first sub-chain 121 and the second sub-chain 122 can be formed in the same manufacturing step and then patterned to form the gap between the first sub-chain 121 and the second chain 122 to have the first sub-chain 121 insulated from the second sub-chain 122. Thus, the first sub-chain 121 and the second sub-chain 122 can be formed in the same manufacturing process to save the cost.

Wherein, the driving electrode chain 110 is an one-piece structure.

It is understood that in the present embodiment, the driving electrode chain 110 is a strip-shaped one-piece structure. That is, the driving electrode chain 110 and the sensing electrode chain 120 are formed at different layers, and the driving electrode chain 110 is a strip-shaped electrode. Such arrangement is capable to form the gap between the driving electrode chain 110 and the sensing electrode chain 120 directly without the needs of forming the insulating structures or applying the patterning step to the driving electrode chain 110, such that the manufacturing cost can be reduced.

It is optional in the present invention to have the extending directions and the arraying directions of the first sub-chain 121 and the second sub-chain 122 identical to that of the sensing electrode chain 120.

It is understood that the first sub-chain 121 and the second sub-chain 122 are spaced apart and parallel to each other and have the extending direction and the arraying direction identical to that of the sensing electrode chain 120.

Wherein, the first capacitor C1 is formed by a portion of the driving electrode chain 110 between the two neighboring sensing electrode chains 120 and one of the first sub-chain 121 and the second sub-chain 122 which is closer to the portion of the driving electrode chain 110. The first capacitor C1 is utilized for deciding a position of the touching element projected on the surface of the touch panel 10.

Figure 2:
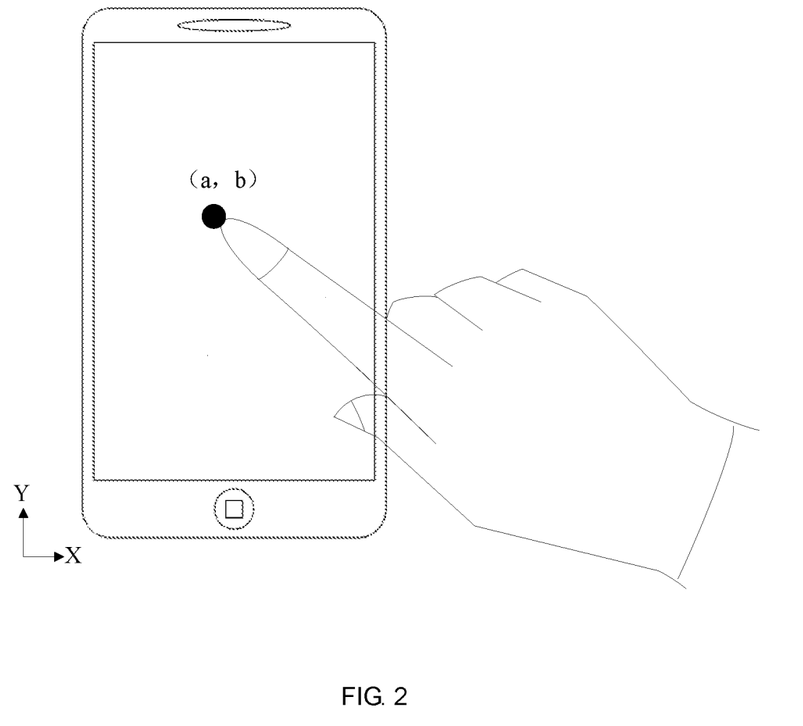
FIG. 2 is a schematic view of detecting the position of a touch element on the surface of the touch panel in accordance with the first embodiment of the present invention.

Please refer to FIG. 1 and FIG. 2, wherein FIG. 2 is a schematic view of detecting the position of a touch element on the surface of the touch panel in accordance with the first embodiment of the present invention. Concretely speaking, the first capacitor C1 can be used to decide the position of the touching element on the surface of the touch panel, i.e. the axis values (a, b) of the touching element on the surface of the touch panel (i.e. X-axis and Y-axis).

Wherein, the second capacitor C2 is formed by the portion of the driving electrode chain 110 between the two neighboring sensing electrode chains 120 and the other one of the first sub-chain 121 and the second sub-chain 122. The second capacitor C2 is utilized for deciding the height of the touching element floating on the surface of the touch panel 10, i.e. the Z-axis value of the touching element.

Figure 3:
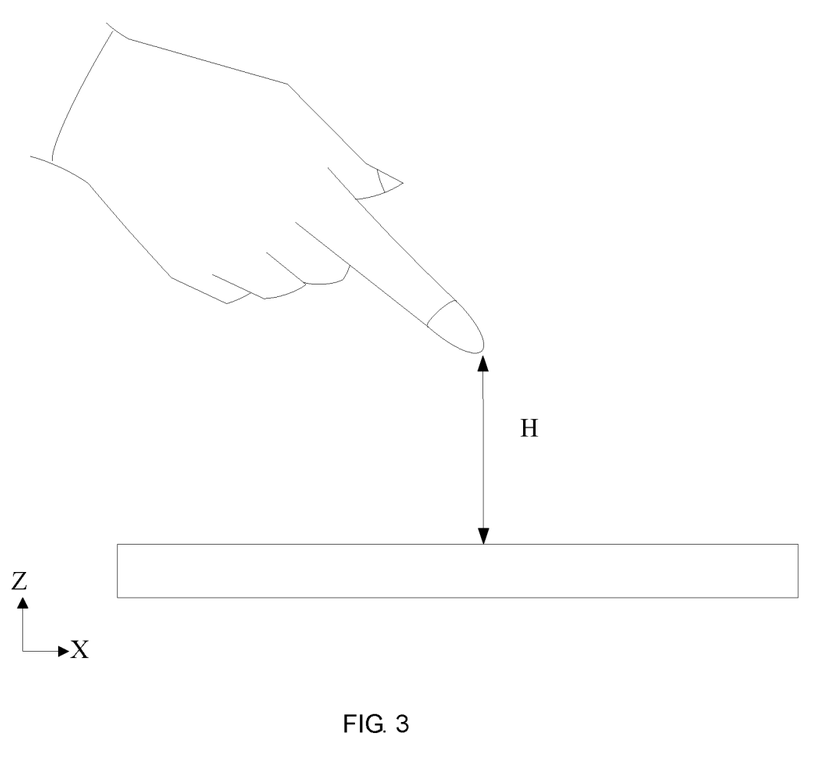
FIG. 3 is a schematic view of detecting a touch element floating above the surface of the touch panel in accordance with the first embodiment of the present invention.

Please refer to FIG. 1 and FIG. 3, wherein FIG. 3 is a schematic view of detecting a touch element floating above the surface of the touch panel in accordance with the first embodiment of the present invention. Concretely speaking, the second capacitor C2 can be used to decide the height H of the touching element floating on the surface of the touch panel, and thereby, the axis values (a, b, H) in the 3D coordinate system (i.e. X, Y, Z coordinate system) as the touching element is floating above the surface of the touch panel can be decided to implement the function of floating positioning.

The first capacitor C1 and the second capacitor C2 have a regular scheme as below. When the touching element is a conductor, the touching element getting closer to the touch panel would cause the capacitance of the first capacitor C1 and the capacitance of the second capacitor C2 decline simultaneously. When the touching element is not a conductor, the touching element getting closer to the touch panel would cause the capacitance of the first capacitor C1 decline but the capacitance of the first capacitor C2 increase. Thus, the change of the capacitance of the first capacitor C1 and the second capacitor C2 when the touching element getting closer to the touch panel can be used to determine whether the touching element is a conductor or not. After the type of the touching element, i.e. the conductor or not, is determined, the size and the height of the touching element can be identified by detecting the value of the capacitance of the first capacitor C1 and the capacitance of the second capacitor C2. These values can be also identified based on the sensitivity of the capacitance change of the first capacitor C1 ($\Delta C1$) and the sensitivity of the capacitance change of the second capacitor C2 ($\Delta C2$) during the period the touching element getting closer to the touch panel. This is because the value of $\Delta C1$ would be larger when the touching element is closer to the touch panel, i.e. the first capacitor C1 is more sensitive to the change, and the value of $\Delta C2$ would be larger when the touching element is farther from the touch panel, i.e. the second capacitor C2 is more sensitive to the change. In sum, the touch panel of the present invention checks the type of the touching element closing to the touch panel first, and then real-time determines the position, the size, and the height of the touching element based on the capacitance of the first capacitor C1, the capacitance of the second capacitor C2, the sensitivity of capacitance change of the first capacitor C1 ($\Delta C1$), and the sensitivity of capacitance change of the second capacitor C2 ($\Delta C2$) so as to implement the function of floating touch.

The sensing electrode chain 120 of the touch panel 10 provided in the present disclosure is divided into two sub-chains, i.e. the first sub-chain 121 and the second sub-chain 122. The first sub-chain 121 is parallel to and insulated from the second sub-chain 122. The first capacitor C1 is formed by a portion of the driving electrode chain 110 between the two neighboring sensing electrode chains 120 and one of the first sub-chain 121 and the second sub-chain 122 which is closer to the portion of the driving electrode chain 110. The first capacitor C1 is utilized for deciding a position of a touching element projected on the surface of the touch panel 10, i.e. the planar coordinate of the touching element on the surface of the touch panel. The second capacitor C2 is formed by the portion of the driving electrode chain 110 between the two neighboring sensing electrode chains 120 and the other one of the first sub-chain 121 and the second sub-chain 122. The second capacitor C2 is utilized for deciding the height H of the touching element away from the surface of the touch pane. Thus, by integrating the results of the first capacitor C1 and the second capacitor C2, the specific position of the touching element in the space above the touch panel can be determined to implement the function of floating positioning.

Figure 4:
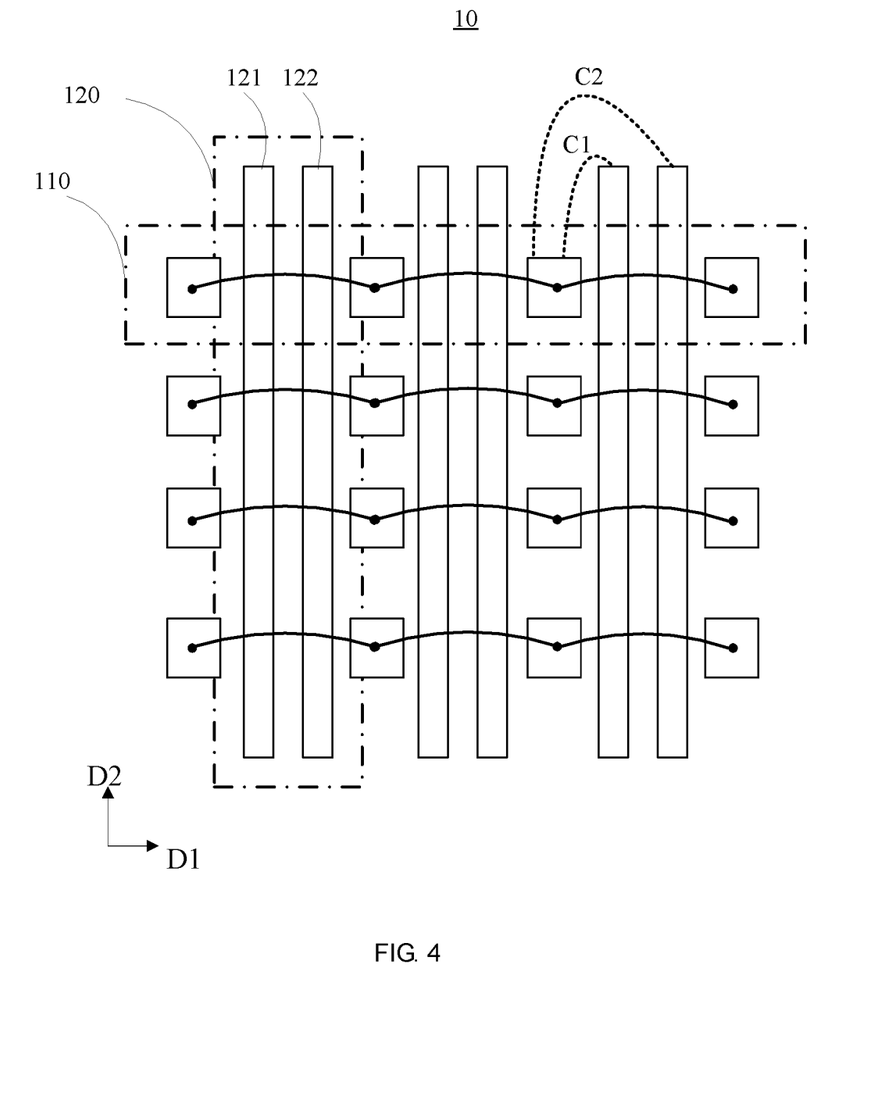
FIG. 4 is a structural schematic view of a touch panel provided in accordance with a second embodiment of the present invention.

Please refer to FIG. 4, wherein FIG. 4 is a structural schematic view of a touch panel provided in accordance with a second embodiment of the present invention. The basic structure of the touch panel provided in the second embodiment of the present invention is substantially identical to the touch panel provided in the first embodiment. The elements in the touch panel provided in the second embodiment have the function identical to the corresponding ones in the first embodiment. The only difference between the two embodiments is that, the driving electrode chain 110 and the sensing electrode chain 120 in the touch panel provided in the second embodiment are located at the same layer. By using such arrangement, the driving electrode chain 110 and the sensing electrode chain 120 can be manufactured in the same process to reduce the manufacturing cost.

Wherein, one driving electrode chain 110 includes a plurality of driving electrodes 111. These driving electrodes 111 are spaced apart from each other and are located in the gap between the two neighboring sensing electrode chains 120. The two neighboring driving electrodes 111 are electrically connected to each other.

Figure 5:
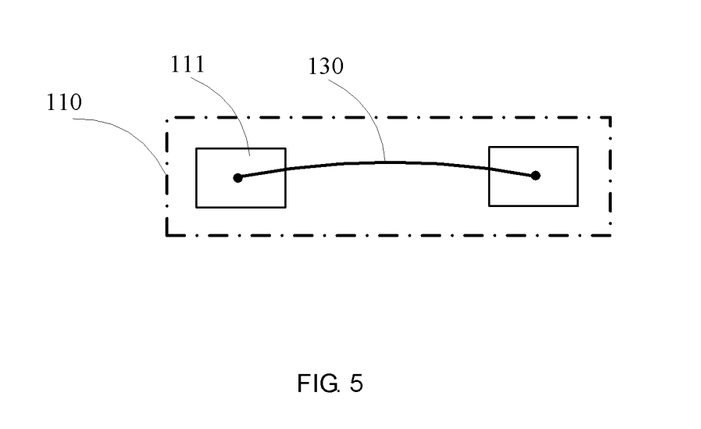
FIG. 5 and FIG. 6 are structural schematic views showing the connection between two neighboring driving electrodes in the touch panel provided in accordance with the second embodiment of the present invention.

It is optional in the present invention to have the two neighboring driving electrodes 111 electrically connected to each other by using the driving line 130 as shown in FIG. 5. The driving line can be a conductive line such as a metal conductive wire, a metal coil, and etc. But the scope of the present invention is not limited thereto.

Figure 6:
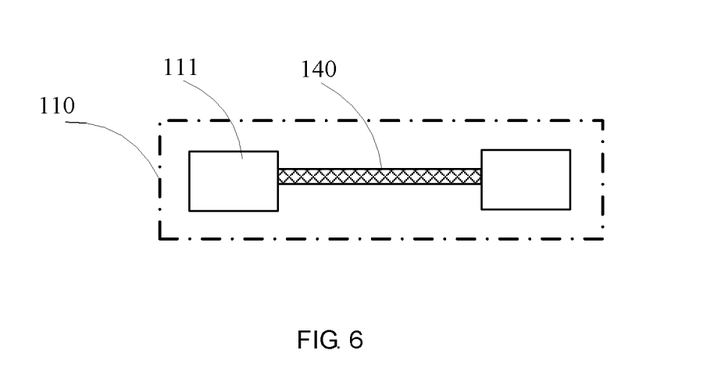

It is optional in the present invention to have the two neighboring driving electrodes 111 electrically connected to each other by using a bridge 140 as shown in FIG. 6. But the scope of the present invention is not limited thereto.

Figure 7:
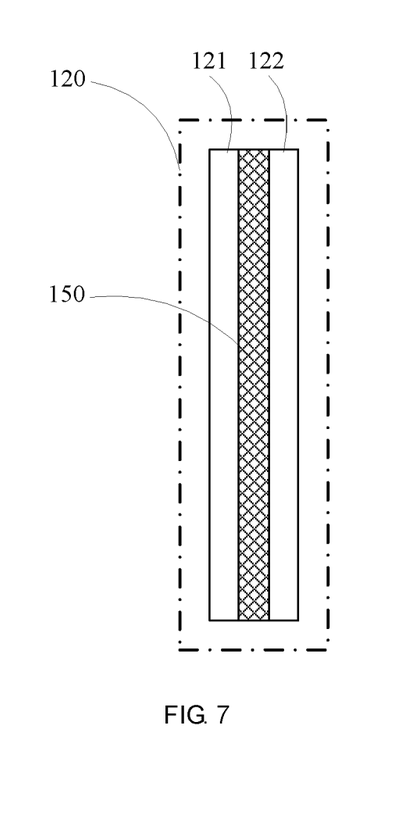
FIG. 7 is a structural schematic view of the insulation arrangement between two neighboring sub-chains in the touch panel provided in accordance with a preferred embodiment of the present invention.

It is optional in the present invention to fill the dielectric material 150 between the neighboring first sub-chain 121 and the second sub-chain 122 as shown in FIG. 7. Such arrangement is capable to prevent the unwanted contact between the first sub-chain 121 and the second sub-chains 122 to compose a single sensing electrode chain 120 rather than two independent capacitors C1, C2 for implementing the function of floating positioning.

Figure 8:
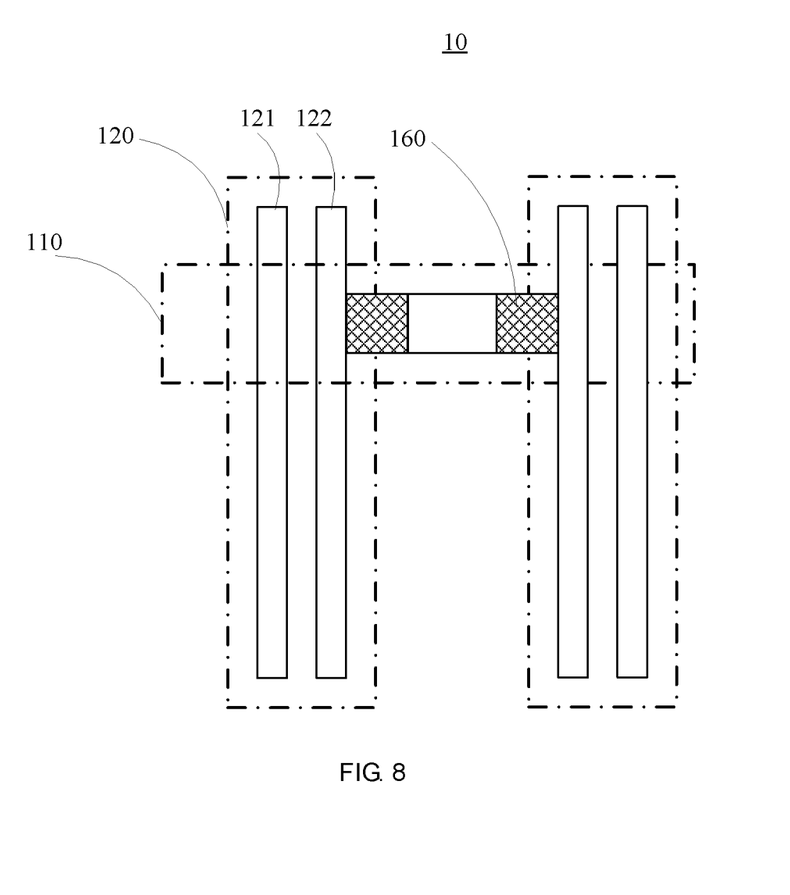
FIG. 8 is a structural schematic view of the insulation arrangement between the driving electrode and the neighboring sensing electrode chains provided in accordance with a preferred embodiment of the present invention.

It is optional in the present invention to fill the insulating material 160 between the two neighboring sensing electrode chains 120 and the driving electrode chain 110 located in the gap between the two neighboring sensing electrode chains 120 as shown in FIG. 8. Such arrangement is capable to prevent the unwanted contact between the driving electrode chain 110 and the sensing electrode chain 120 to make sure that the first capacitor C1 and the second capacitor C2 can be formed for implementing the function of floating positioning.

The sensing electrode chain 120 of the touch panel 10 provided in the present disclosure is divided into two sub-chains, i.e. the first sub-chain 121 and the second sub-chain 122. The first sub-chain 121 is parallel to and insulated from the second sub-chain 122. The first capacitor C1 is formed by a portion of the driving electrode chain 110 between the two neighboring sensing electrode chains 120 and one of the first sub-chain 121 and the second sub-chain 122 which is closer to the portion of the driving electrode chain 110. The first capacitor C1 is utilized for deciding the position of the touching element projected on the surface of the touch panel 10, i.e. the planar coordinate of the touching element on the surface of the touch panel. The second capacitor C2 is formed by the portion of the driving electrode chain 110 between the two neighboring sensing electrode chains 120 and the other one of the first sub-chain 121 and the second sub-chain 122. The second capacitor C2 is utilized for deciding the height H of the touching element away from the surface of the touch panel. Thereby, by integrating the results of the first capacitor C1 and the second capacitor C2, the specific position of the touching element in the space above the touch panel can be determined to implement the function of floating positioning.

Figure 9:
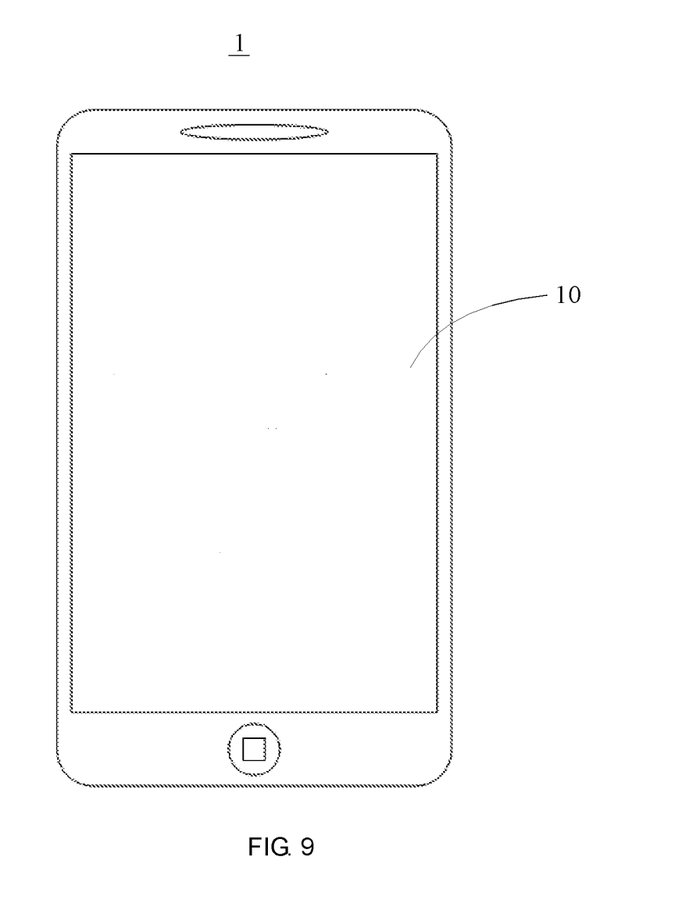
FIG. 9 is a structural schematic view of the touch control device provided in accordance with an embodiment of the present invention.

Please refer to FIG. 9, which is a structural schematic view of the touch control device provided in accordance with an embodiment of the present invention. The touch control device 1 includes a touch panel 10, which can be the touch panel 10 provided in anyone of the aforementioned embodiments, and thus is not repeated here. The touch control device 1 can be, but not limited to, an e-book, a smart phone (such as an Android phone, and an iOS phone, a Windows phone, and etc.), a tablet, a handheld computer, a notebook, a mobile internet device (MID), or a wearable device, and etc.

The foregoing contents are detailed description of the disclosure in conjunction with specific preferred embodiments and concrete embodiments of the disclosure are not limited to the description. For the person skilled in the art of the disclosure, without departing from the concept of the disclosure, simple deductions or substitutions can be made and should be included in the protection scope of the application.

What is claimed is:

1. A touch panel, comprising:
   a plurality of driving electrode chains, extending along a first direction and spaced apart along a second direction; and
   a plurality of sensing electrode chains, extending along the second direction and spaced apart along the first direction, wherein the driving electrode chains and the sensing electrode chains are insulated from each other, the sensing electrode chains includes a first sub-chain and a second sub-chain, and the first sub-chain and the second sub-chain are parallel to and insulated from each other;
   wherein a first capacitor is formed by a portion of the driving electrode chain between the two neighboring sensing electrode chains and one of the first sub-chain and the second sub-chain which is closer to the portion of the driving electrode chain, and the first capacitor is utilized for deciding a position of a touching element projected on a surface of the touch panel;
   wherein a second capacitor is formed by the portion of the driving electrode chain between the two neighboring sensing electrode chains and the other one of the first sub-chain and the second sub-chain, and the second capacitor is utilized for deciding a height of the touching element floating on the surface of the touch panel, and
   wherein the capacitance of the first capacitor and the capacitance of the second capacitor decline simultaneously in case the touching element is a conductor, and the capacitance of the first capacitor declines and the capacitance of the second capacitor increases in case the touching element is a not a conductor.

2. The touch panel of claim 1, wherein the driving electrode chain and the sensing electrode chain are disposed at a same layer.

3. The touch panel of claim 2, wherein the driving electrode chain includes a plurality of driving electrodes, which are spaced apart from each other and located in a gap between the two neighboring sensing electrode chains, and the two neighboring driving electrodes are electrically connected to each other.

4. The touch panel of claim 3, wherein the two neighboring driving electrodes are electrically connected to each other through a driving line.

5. The touch panel of claim 2, wherein an insulating material is filled between the two neighboring sensing electrode chains and the driving electrode chain located in a gap between the two neighboring sensing electrode chains.

6. The touch panel of claim 1, wherein the driving electrode chain is an one-piece structure.

7. The touch panel of claim 1, wherein extending directions and arraying directions of the first sub-chain and the second sub-chain are identical to that of the sensing electrode chain.

8. The touch panel of claim 7, wherein an insulating material is filled between the neighboring first sub-chain and the second sub-chain.

9. The touch panel of claim 1, wherein the first direction is orthogonal to the second direction.

10. A touch control device, comprising:
    a touch panel, comprising: a plurality of driving electrode chains, extending along a first direction and spaced apart along a second direction; and
    a plurality of sensing electrode chains, extending along the second direction and spaced apart along the first direction, wherein the driving electrode chains and the sensing electrode chains are insulated from each other, the sensing electrode chains includes a first sub-chain and a second sub-chain, the first sub-chain and the second sub-chain are parallel to and insulated from each other;
    wherein a first capacitor is formed by a portion of the driving electrode chain between the two neighboring sensing electrode chains and one of the first sub-chain and the second sub-chain which is closer to the portion of the driving electrode chain, and the first capacitor is utilized for deciding a position of a touching element projected on a surface of the touch panel;
    wherein a second capacitor is formed by the portion of the driving electrode chain between the two neighboring sensing electrode chains and the other one of the first sub-chain and the second sub-chain, and the second capacitor is utilized for deciding a height of the touching element floating on the surface of the touch panel, and
    wherein the capacitance of the first capacitor and the capacitance of the second capacitor decline simultaneously in case the touching element is a conductor, and the capacitance of the first capacitor declines and the capacitance of the second capacitor increases in case the touching element is a not a conductor.

11. The touch control device of claim 10, wherein the driving electrode chain and the sensing electrode chain are deposited at a same layer.

12. The touch control device of claim 11, wherein the driving electrode chain includes a plurality of driving electrodes, which are spaced apart from each other and located in a gap between the two neighboring sensing electrode chains, and the two neighboring driving electrodes are electrically connected to each other.

13. The touch control device of claim 12, wherein the two neighboring driving electrodes are electrically connected to each other through a driving line.

14. The touch control device of claim 11, wherein an insulating material is filled between the two neighboring sensing electrode chains and the driving electrode chain located in a gap between the two neighboring sensing electrode chains.

15. The touch control device of claim 10, wherein the driving electrode chain is an one-piece structure.

16. The touch control device of claim 10, wherein extending directions and arraying directions of the first sub-chain and the second sub-chain are identical to that of the sensing electrode chain.

17. The touch control device of claim 16, wherein an insulating material is filled between the neighboring first sub-chain and the second sub-chain.

18. The touch control device of claim 10, wherein the first direction is orthogonal to the second direction.

* * * * *